United States Patent
Miyaoka et al.

(10) Patent No.: US 9,154,023 B2
(45) Date of Patent: Oct. 6, 2015

(54) SPINNING PROCESSING METHOD AND ROTOR SHAFT

(75) Inventors: Hiroshi Miyaoka, Tokyo (JP); Naoto Taguchi, Matsudo (JP)

(73) Assignee: Nissan Motor Co., Ltd., Yokohama (JP)

( * ) Notice: Subject to any disclaimer, the term of this patent is extended or adjusted under 35 U.S.C. 154(b) by 344 days.

(21) Appl. No.: 13/877,078

(22) PCT Filed: Jun. 15, 2012

(86) PCT No.: PCT/JP2012/065325
§ 371 (c)(1),
(2), (4) Date: Mar. 29, 2013

(87) PCT Pub. No.: WO2013/002041
PCT Pub. Date: Jan. 3, 2013

(65) Prior Publication Data
US 2013/0193802 A1    Aug. 1, 2013

(30) Foreign Application Priority Data

Jun. 28, 2011   (JP) ................. 2011-142586

(51) Int. Cl.
*B21D 22/14* (2006.01)
*H02K 15/02* (2006.01)
*H02K 1/22* (2006.01)
*B21D 35/00* (2006.01)
*B21D 53/26* (2006.01)
*H02K 1/30* (2006.01)

(52) U.S. Cl.
CPC ............... *H02K 15/02* (2013.01); *B21D 22/14* (2013.01); *B21D 35/007* (2013.01); *B21D 53/26* (2013.01); *H02K 1/22* (2013.01); *H02K 1/30* (2013.01); *Y10T 29/49012* (2015.01)

(58) Field of Classification Search
CPC ........ B21D 22/14; B21D 22/16; B21D 22/18; B21D 35/007; B21D 39/031; B21D 53/30; B21D 53/26; Y10T 29/49813
See application file for complete search history.

(56) References Cited

U.S. PATENT DOCUMENTS 5,718,140 A * 2/1998 Koestermeier et al. ........... 72/71
6,105,410 A * 8/2000 Sauberlich et al. ............... 72/71
7,677,071 B2 * 3/2010 Heirich ........................... 72/181

FOREIGN PATENT DOCUMENTS

JP   7-100568 A     4/1995
JP   10-5912 A      1/1998
JP   2001-150076 A  6/2001

(Continued)

OTHER PUBLICATIONS

The Russian Office Action for the corresponding Russian Application No. 2013113964/02(020629) issued on Mar. 10, 2015, including a translation.

(Continued)

*Primary Examiner* — Debra Sullivan
(74) *Attorney, Agent, or Firm* — Global IP Counselors, LLP

(57) ABSTRACT

In a spinning processing method of processing cylindrical parts includes: joining at least two sheets of metal plates by bring together sheet surfaces of the metal plates; rotating the metal plates using a rotating shaft that is arranged perpendicular to the sheet surfaces of the metal plates; applying a separating and deforming force at a coupling position on a periphery of the at least two sheets of the metal plates to separate and deform the metal plates while the at least two sheets of the metal plates rotate; and applying a cylinder forming force to at least one of the metal plates to form a cylinder along the rotating shaft.

9 Claims, 5 Drawing Sheets

(56) References Cited

FOREIGN PATENT DOCUMENTS

| | | |
|---|---|---|
| JP | 2001-212641 A | 8/2001 |
| JP | 4123705 B | 5/2008 |

OTHER PUBLICATIONS

An English translation of the Chinese Office Action for the corresponding Chinese patent application No. 201280003111.7 issued on May 28, 2014.

* cited by examiner

Finished Product Shape (Example)

SPINNING PROCESSING METHOD AND ROTOR SHAFT

CROSS-REFERENCE TO RELATED APPLICATIONS

This application is a U.S. National stage application of International Application No. PCT/JP2011/065325, filed Jul. 5, 2011, which claims priority claims priority under to Japanese Patent Application No. 2011-142586, filed in Japan on Jun. 28, 2011, the entire contents of which is hereby incorporated by reference.

BACKGROUND

1. Field of the Invention

The present invention relates to a spinning processing method for processing cylindrical parts such as a motor rotor, a clutch drum, or the like, and a rotor shaft.

2. Background Information

Generally, cylindrical parts such as a motor rotor, a clutch drum, or the like are manufactured according to the forging-cutting method. Also, when manufacturing cylindrical parts by employing the spinning processing method, the splitting apart method of using one piece of a disc-shaped sheet as the working material, dividing the peripheral edge of this sheet into two in its thickness direction, and splitting apart this divided material has been adapted (e.g., refer to Japanese Patent No. 4123705).

Here, "spinning process" refers to a plastic process method, which carries out a molding by pressing a sheet-shaped material (a blank) in a rotating die (a mandrel) using a processing roller or a spatula.

SUMMARY

However, the conventional spinning processing method was a splitting apart method of dividing the peripheral edge of a sheet into two in the thickness direction and splitting apart this divided material. Consequently, there was a problem of the process being difficult when processing cylindrical parts that have an unbalanced sheet thickness and volume.

The present invention was developed in view of the problem described above, and one object is to provide a spinning processing method capable of making the process easy even for cylindrical parts that have an unbalanced sheet thickness and volume.

In order to achieve the object described above, the present invention provides a material joining step, a material separation and deformation step, and a cylinder forming step to a spinning processing method for processing cylindrical parts. The material joining step aligns and joins the sheet surfaces of at least two sheets of metal plates. The material separation and deformation step rotates the metal plate by rotating a shaft that is perpendicular to the surface of the sheet material and carries out separation and deformation by applying force at the coupling position on the periphery of at least two sheets of metal plates that have been joined. The cylinder forming step applies force to at least one sheet of metal plate and forms a cylinder along the rotating shaft.

Consequently, cylindrical parts are manufactured through the steps, including material joining step→material separation and deformation step→cylinder forming step. Namely, cylindrical parts are manufactured according to the separation and deformation method that carries out a deformation by applying force at the coupling position on the periphery of at least two sheets of metal plates that have been joined from among the spinning processing method instead of the splitting apart method that divides and splits apart the peripheral edge part of one sheet of a disc-shaped sheet material into two in the thickness direction. Therefore, the volume distribution in the shape of the finished product is taken into consideration in deciding the sheet thickness and shape of at least two metal plates that are the working materials and the surfaces of the decided metal plates are aligned and joined in advance. Consequently, even cylindrical parts that have an unbalanced sheet thickness and volume can be handled with easy process. As a result, the process is made easy even for cylindrical parts that have an unbalanced sheet thickness and volume.

BRIEF DESCRIPTION OF THE DRAWINGS

Referring now to the attached drawings, which form a part of this original disclosure, the drawings will be briefly described.

DETAILED DESCRIPTION OF THE EMBODIMENTS

Selected embodiments for realizing the spinning processing method and the rotor shaft according to the present invention will be explained below based on the embodiment shown in the figures.

The laminate spinning processing method in a first embodiment will be explained by separating into the explanation of "configuration of the motor and clutch unit," "step in the laminate spinning processing method," "problems in the method of the comparative examples," "basic step and functions of the laminate spinning processing method," "functions according to the laminate spinning processing method," and "effects of the laminate spinning processing method in the first embodiment."

Configuration of the Motor and Clutch Unit

Figure 1:
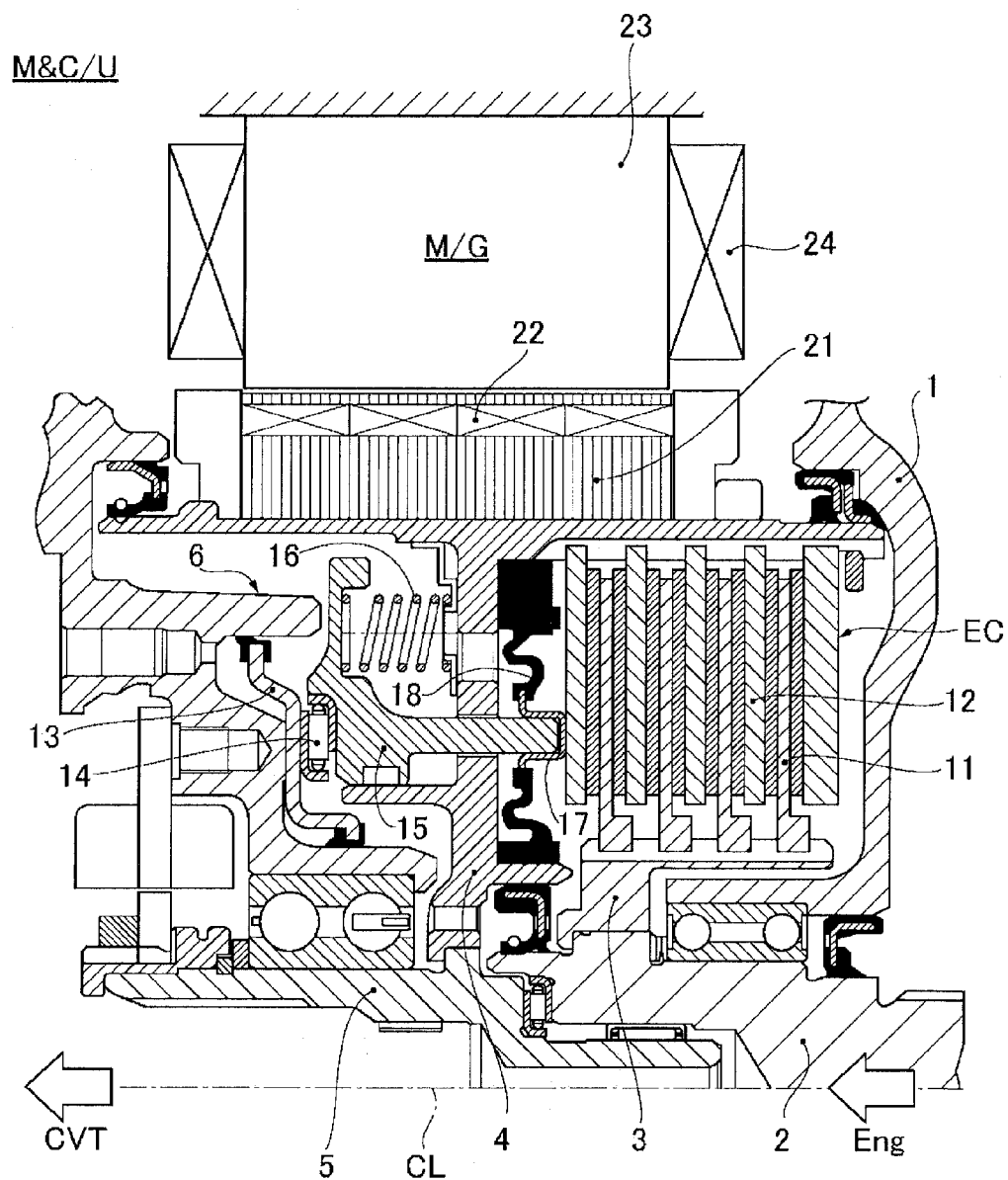
FIG. 1 is a cross sectional view showing a motor and clutch unit of a hybrid vehicle that employed a rotor shaft manufactured according to the laminate spinning processing method in the first embodiment.
Figure 2:
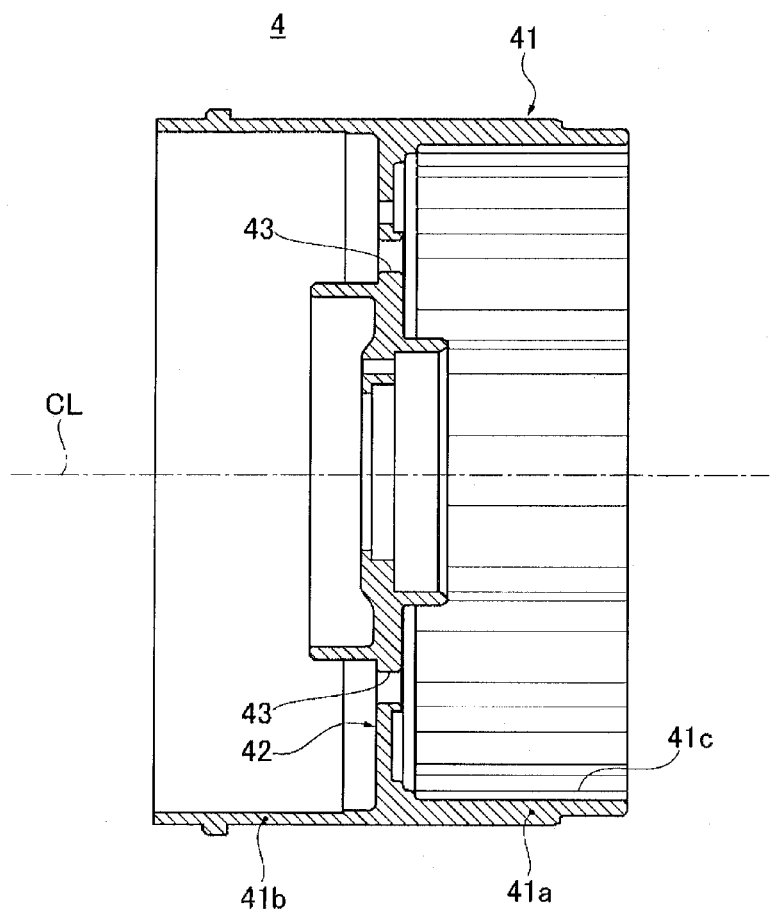
FIG. 2 is a cross sectional view showing a rotor shaft manufactured according to the laminate spinning processing method in the first embodiment.

FIG. 1 is a cross sectional view showing a motor and clutch unit of a hybrid vehicle that employed a rotor shaft manufactured according to the laminate spinning processing method in the first embodiment. FIG. 2 is a cross sectional view showing a rotor shaft. The configuration of the motor and clutch unit will be explained below based on FIG. 1 and FIG. 2.

The motor and clutch unit M & C/U of a hybrid vehicle comprises a unit case 1, an engine shaft 2, a clutch hub 3, a multiple-disc dry clutch EC, a rotor shaft 4 (cylindrical parts), a transmission shaft 5, a motor/generator M/G, and a clutch actuator 6 as shown in FIG. 1.

The motor and clutch unit M & C/U is interposed between the engine Eng, not shown in the figure, and the belt-type variable transmission CVT, not shown in the figure; the motor and clutch unit is a hybrid drive unit built-in with a multiple-disc dry clutch EC that disconnects the connection to the engine Eng and the motor/generator M/G.

Namely, when the multiple-disc dry clutch EC is released, the motor/generator M/G and the transmission shaft 5 are connected through the rotor shaft 4. With this release of the clutch, the vehicle is set to the "electric vehicle driving mode" that has only the motor/generator M/G as the drive source.

And then, when the multiple-disc dry clutch EC is operated, the engine Eng and the rotor shaft 4 are connected through the engine shaft 2, the clutch hub 3 and the multiple-disc dry clutch EC. This operation of the clutch sets the vehicle in the "hybrid vehicle driving mode" that has the motor/generator M/G and the engine Eng as the drive source.

The multiple-disc dry clutch EC is configured by alternately arranging a drive plate 11, which is fitted to a clutch hub 3, and a driven plate 12, which is fitted to a rotor shaft 4 as shown in FIG. 1. This multiple-disc dry clutch EC is a normal open clutch and operates by a clutch oil pressure being fed to the clutch actuator 6. The clutch actuator 6 comprises a piston 13, a needle bearing 14, a piston arm 15 that penetrates the rotor shaft 4 at a plurality of spots, a return spring 16, an arm press-in plate 17, and a bellows elastic support member 18.

The motor/generator M/G is a synchronizing AC motor and comprises a rotor 21 that is fixed to the peripheral surface of the rotor shaft 4 and a permanent magnet 22 that is embedded in the rotor 21 as shown in FIG. 1. Also, the motor/generator has a stator 23 that is fixed to the unit case 1 and arranged on the rotor 21 through the medium of an air gap and a stator coil 24 that is wound on the stator 23.

The rotor shaft 4 comprises a cylindrical drum 41 that is parallel along the central rotating shaft CL and a partition wall 42 that extends inward in a radial direction that is orthogonal to the central rotating shaft CL from the center position on the interior of the cylindrical drum 41 as shown in FIG. 2. The cylindrical drum 41 is divided into the clutch part 41a that is arranged therein with a multiple-disc dry clutch EC and the actuator part 41b that is arranged therein with a clutch actuator 6 by interposing the partition wall 42. And then, the cylindrical drum 41 is made into an unbalanced shape wherein the volume, including the thickness and the length, of the clutch part 41a formed on the interior with a tooth spline 41c is larger than that of the actuator part 41b.

The rotor 21 of the motor/generator M/G is fixed to the rotor shaft 4 in the peripheral surface area that extends over to the clutch part 41a and the actuator part 41b of the cylindrical drum 41 (functions as a component of the motor rotor) as shown in FIG. 1. And then, a driven plate 12 is fitted to the tooth spline 41c that is formed on the interior of the clutch part 41a of the cylindrical drum 41 (functions as a component of the clutch drum). Furthermore, a through hole 43 for the piston arm 15 of the clutch actuator 6 is formed in the partition wall 42.

Furthermore, the rotor shaft 4 has a function of partitioning into three spaces, which are the wet space for arranging the clutch actuator 6, the first dry space for arranging the multiple-disc dry clutch EC, and the second dry space for arranging the motor/generator M/G as shown in FIG. 1.

Each Step in the Laminate Spinning Processing Method

FIGS. 3 to 7 are figures showing each of the steps in the laminate spinning processing method of the first embodiment. Below, each step in the laminate spinning processing method for processing a rotor shaft 4 in the first embodiment will be explained based on FIGS. 3 to 7.

Material Joining Step

Figure 3:
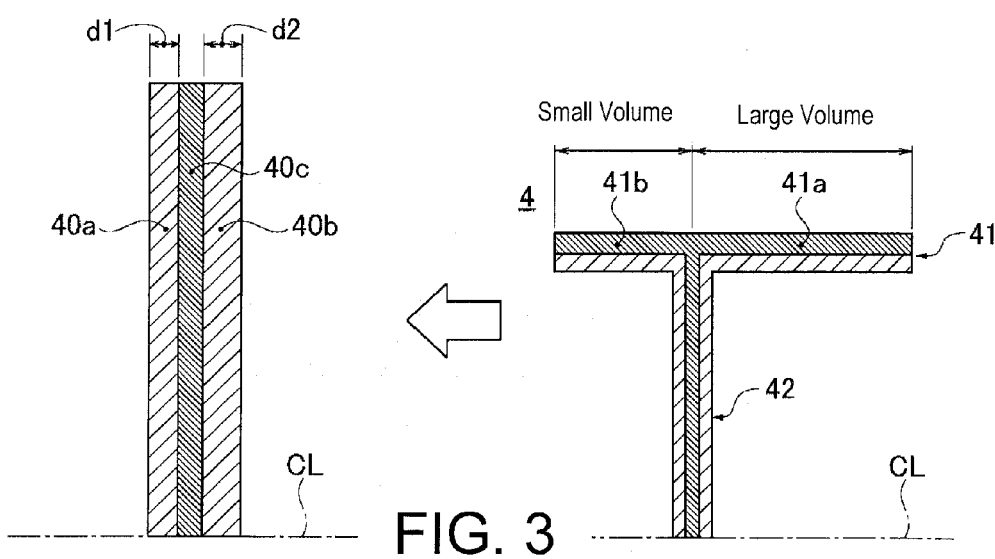
FIG. 3 is a step explanatory drawing showing the joining material (a) in the material joining step and the completed product shape (b) of a rotor shaft in the laminate spinning processing method of the first embodiment.

The material joining step is a step of aligning one sheet of the second metal plate 40c wherein the raw material varies from the first metal plate 40a, 40b between the two sheets of the first metal plates 40a, 40b wherein the sheet thickness varies, and of joining them by welding as shown in part (a) of FIG. 3. The first metal plates 40a, 40b are steel sheets that use a generic structural carbon steel or the like as the raw material. The second metal plate 40c is an aluminum sheet that uses an aluminum alloy or the like as the raw material.

The sheet thickness and shape of the two sheets of the first metal plates 40a, 40b are decided by giving consideration to the distribution of the volume such as the sheet thickness, the shape, or the like of the finished product of the rotor shaft 4 shown in part (b) of FIG. 3. Namely, the volume distribution of the rotor shaft 4 has a relationship of the clutch part 41a (large volume)>the actuator part 41b (small volume). Therefore, the sheet thickness d1 of the first metal plate 40a is made thin and the sheet thickness d2 (>d1) of the first metal plate 40b is made thicker than that of the first metal plate 40a so as to correspond with the volume distribution. The structure of the finished product of the rotor shaft 4 varies from the structure of the finished product obtained in the forging-cutting method in that it has a structure wherein an aluminum layer is superimposed on the steel sheet material, which is the primary structure, as shown in part (b) of FIG. 3.

As the welding method for joining the second metal plate 40c between the first metal plates 40a, 40b, penetration welding according to EBW (abbreviation for Electron Beam Welding), laser welding, or the like or resistance welding according to CDW (abbreviation for Capacitor discharge welding), seam welding, or the like is employed. The area of the center of rotation that excludes the area for applying the separation and deformation processing (the joined area in the finished product) is joined according to penetration welding or resistance welding.

The center of rotation (the section that becomes the partition wall 42) of the sheet materials 40a, 40b, and 40c that have been joined is held firmly with the die to transmit a rotary drive force at the time of the laminate spinning process. Therefore, the joints of the sheet materials 40a, 40b, and 40c do not become separated in the separation and deformation process of the steel sheet material or the splitting apart process of the aluminum sheet material.

Material Separation and Deformation Step

Figure 4:
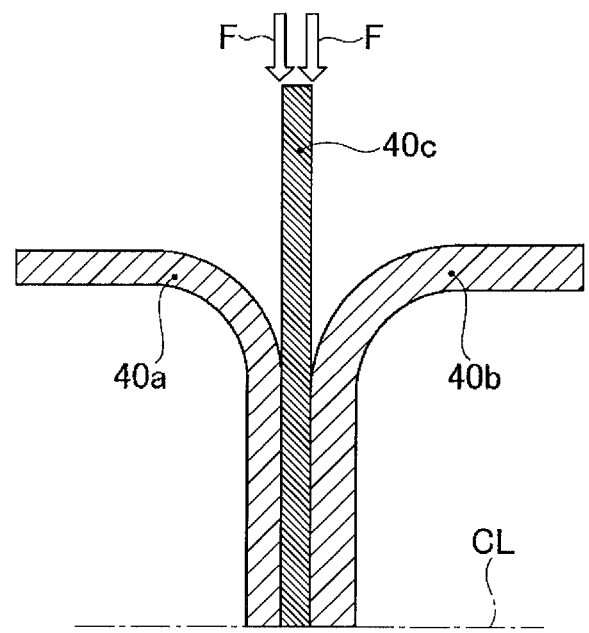
FIG. 4 is a step explanatory drawing showing the separation and deformation material in the material separation and deformation step in the laminate spinning processing method of the first embodiment.

The material separation and deformation step applies forces F, F to the coupling positions on the periphery of the two sheets of the first metal plates 40a, 40b arranged on both sides of and joined to the second metal plate 40c as shown in FIG. 4. Therefore, it is a step of separating and deforming the two sheets of the first metal plates 40a, 40b arranged on both sides of the one piece of the second metal plate 40c arranged at the center.

Namely, the material separation and deformation step varies from the splitting apart method and is a step of separating the two sheets of the first metal plates 40a, 40b from the second metal plate 40c, which is the one piece of aluminum sheet material arranged at the center, and simply curving the first metal plates 40a, 40b, which are steel sheet material, outward.

Cylinder Forming Step

Figure 5:
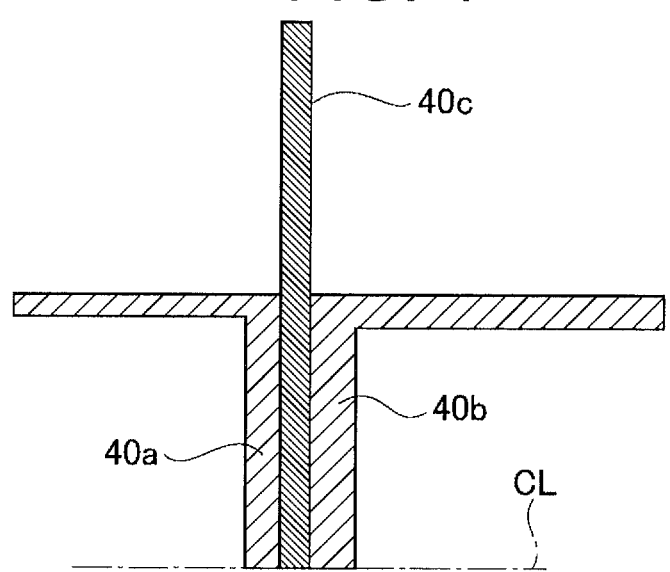
FIG. 5 is a step explanatory drawing showing the cylinder forming material in the cylinder forming step in the laminate spinning processing method of the first embodiment.

The cylinder forming step is a step that applies force to the two sheets of the first metal plates 40a, 40b arranged on both sides with a pressure roller and forms a cylinder along the rotating shaft CL as shown in FIG. 5.

Namely, the cylinder forming step is a step of forming the primary structural part of the rotary shaft 4 by molding the deformed first metal plates 40a, 40b of a steel sheet material according to spinning process.

Splitting Apart Step

Figure 6:
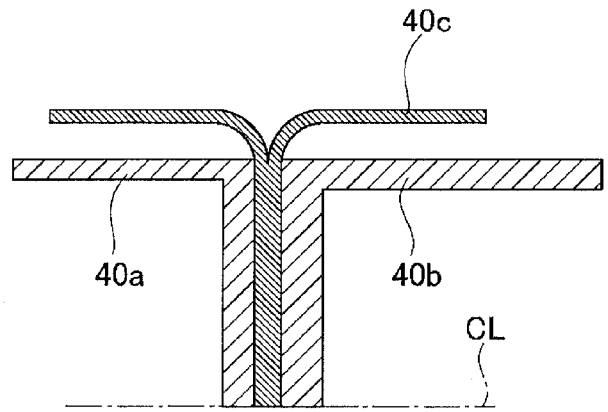
FIG. 6 is a step explanatory drawing showing the splitting apart material in the splitting apart step in the laminate spinning processing method of the first embodiment.

The splitting apart step is a step of dividing the peripheral edge of the one sheet of the second metal plate 40c arranged at the center into two in the thickness direction after the cylinder forming step and splitting apart the aluminum material that was divided into two according to the splitting apart method as shown in FIG. 6.

Namely, the splitting apart step is a step of carrying out a molding by applying the "splitting apart method" on an aluminum sheet material wherein the hardness is less than that of the steel sheet material and is easier to mold.

Aluminum Layer Forming Step (Second Metal Layer Forming Step)

Figure 7:
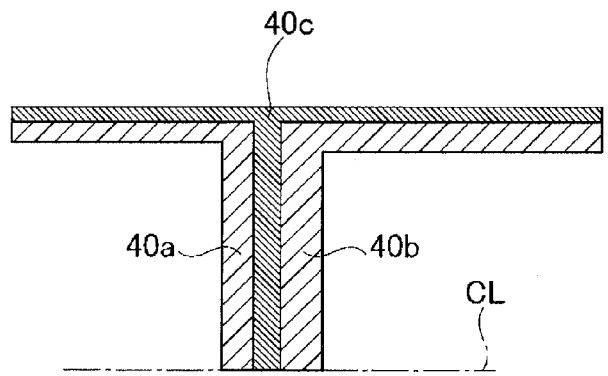
FIG. 7 is a drawing showing the aluminum layer forming material in the aluminum layer forming step in the laminate spinning processing method of the first embodiment.

The aluminum layer forming step is a step of forming an aluminum layer on a steel sheet cylindrical surface along the rotating shaft CL by applying force to the second metal plate 40c that was split apart with a pressure roller as shown in FIG. 7.

Namely, the aluminum layer forming step is a step of forming a flat aluminum layer on the periphery of a finished product.

Problems in the Method of the Comparison Examples

Figure 8:
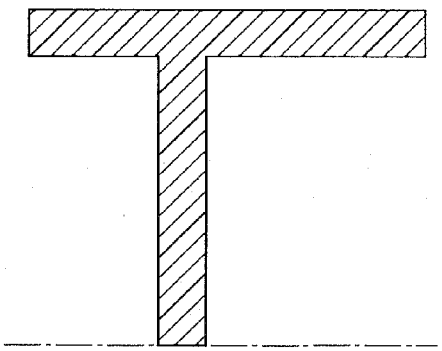
FIG. 8 is a schematic cross sectional view showing the completed product shape of a rotor shaft that was processed according to the forging-cutting method in Comparative Example 1.

Generally, cylindrical parts such as a motor roller, a clutch drum, or the like are manufactured according to the forging-cutting method (Comparative Example 1) as shown in FIG. 8.

However, in the case of the forging-cutting method in Comparative Example 1, the parts are made thick, which is inconvenient from the standpoint of the weight. Also, it requires many man-hours and is inconvenient from the standpoint of the cost. In addition, the usable material is limited to only one kind.

Figure 9:
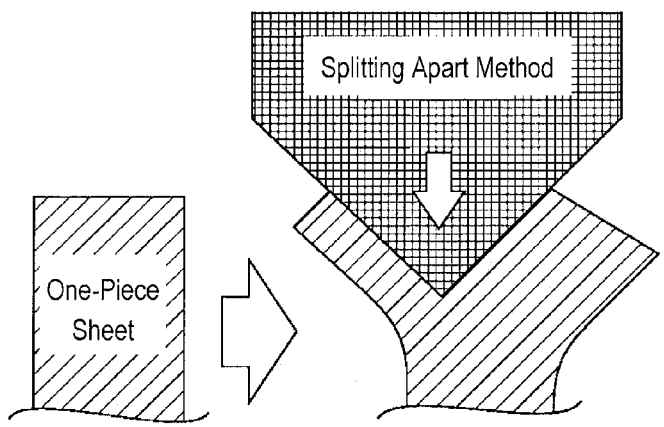
FIG. 9 is an explanatory drawing showing a material in the split-apart state obtained according to the splitting apart method in Comparative Example 2.

Also, cylindrical parts such as a motor rotor, a clutch drum, or the like are manufactured by employing a spinning process that is advantageous from the standpoint of the weight and the cost in comparison to the forging-cutting method. When carrying out the manufacture by employing this spinning process, the splitting apart method (Comparative Example 2) is employed as shown in FIG. 9.

However, the splitting apart method is a method that uses one piece of a disc-shaped sheet as the working material, divides the peripheral edge of one sheet into two in the thickness direction, and splits apart the material that has been divided into two. Therefore, the step is made difficult when processing the cylindrical parts that have unbalanced sheet thickness and volume. Namely, when processing the cylindrical parts that have unbalanced sheet thickness and volume, the splitting apart position takes on a position displaced to one side from the center position of the sheet thickness for splitting the sheet thickness into half and there is a tendency for damage or the like to occur from generation of cracks, concentration of stress, or the like during the step of spitting apart the divided material that has a small sheet thickness.

Also, even in the case of the splitting apart method, the usable material is limited to one kind due to the use of one piece of sheet as the working material.

Basic Steps and Functions in the Laminate Spinning Processing Method

In the laminate spinning processing method in the first embodiment, an example for manufacturing a rotor shaft 4 that laminated an aluminum layer on a steel sheet material, which is the primary structure, by using a raw material with a triple layer structure of steel sheet material-aluminum sheet material-steel sheet material was shown. Here, the basic steps and the functions in a spinning processing method that excludes the lamination of the aluminum layer will be explained.

The spinning processing method according to the basic step is for manufacturing cylindrical parts by using a raw material with, for example, a double layer structure of steel sheet material-steel sheet material and is provided with a material joining step, a material separation and deformation step, and a cylinder forming step.

Figure 10:
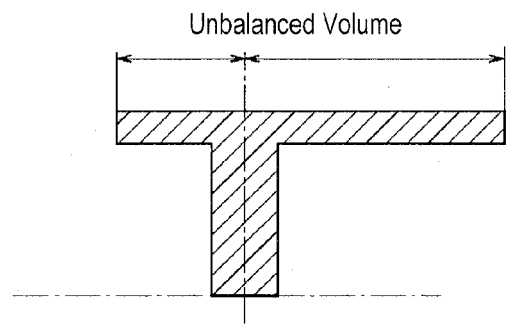
FIG. 10 is a drawing showing an example of cylindrical parts manufactured according to the spinning processing method in the first embodiment wherein the completed product shape has an unbalanced volume.
Figure 11:
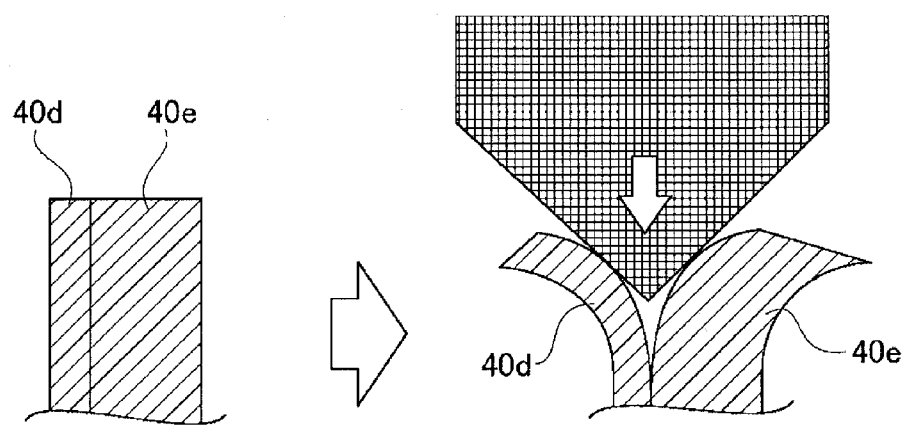
FIG. 11 is an explanatory drawing of the basic step that shows the joining material (a) in the material joining step and the separation and deformation material (b) in the material separation and deformation step in the spinning processing method of the first embodiment.

In the material joining step, the sheet surfaces of the two sheets of the metal plates 40d, 40e are aligned and joined as shown in part (a) of FIG. 11. At this time, the sheet thickness and the shape of the two sheets of the metal plates 40d, 40e are decided by giving consideration to the volume distribution such as the sheet thickness, shape, or the like of the finished cylinder parts shown in FIG. 10. Therefore, the sheet thickness of the metal plate 40d is made thin and the sheet thickness of the metal plate 40e is made thick to correspond with the volume distribution.

In the material separation and deformation step, the metal plates 40d, 40e are rotated by a rotating shaft perpendicular to the surface of the sheet material, and separation and deformation are carried out by applying force at the coupling position on the periphery of the two sheets of the metal plates 40d, 40e that have been joined as shown in part (b) of FIG. 11.

The cylinder forming step forms a cylinder along the rotating shaft by applying force to the two sheets of the metal plates 40d, 40e that have been separated and deformed with a pressure roller.

The cylindrical parts shown in FIG. 10 is manufactured through the steps, including material joining step→material separation and deformation step→cylinder forming step.

Namely, cylindrical parts are manufactured according to the separation and deformation method (part (b) of FIG. 11) that carries out the deformation by applying force at the coupling position on the periphery of the two sheets of the metal plates 40d, 40e that have been joined from among the spinning processing method instead of the splitting apart method that divides and splits apart the peripheral edge of the one piece of a disc-shaped sheet material into two (FIG. 9).

Therefore, the volume distribution of the finished product shape is given into consideration to decide on the sheet thickness and the shape of the two sheets of the metal plates 40d, 40e, which are the working materials, and the surfaces of the metal plates 40d, 40e are aligned and joined in advance. Consequently, the process is made easy even for cylindrical parts that have an unbalanced sheet thickness and volume like that shown in FIG. 10. Furthermore, it is possible to use two kinds of metal materials by varying the kind of material used for the two sheets of the metal plates, which are the working materials.

Functions According to the Laminate Spinning Processing Method

The functions according to the laminate spinning processing method in the first embodiment for manufacturing a rotor shaft 4 that used a triple layer structure of steel sheet material-aluminum sheet material-steel sheet material for the material and laminated and aluminum layer on the steel sheet material, which is the primary structure, will be explained.

The laminate spinning processing method in the first embodiment is provided with a material joining step (FIG. 3), a material separation and deformation step (FIG. 4), a cylinder forming step (FIG. 5), a splitting apart step (FIG. 6), and an aluminum layer forming step (FIG. 7).

Therefore, a rotor shaft 4 wherein an aluminum layer is superimposed on a steel sheet material, which is the primary structure, is manufactured as shown in FIG. 7 through the steps of material joining step→a material separation and deformation step→cylinder forming step→splitting apart step→aluminum layer forming step.

By forming the material into a triple layer structure of steel sheet material-aluminum sheet material-steel sheet material as described above, the product structure can be made into a structure wherein an aluminum is superimposed as a layer on a structure formed from a steel sheet material, and surface smoothness in the product can be easily achieved by using an easily moldable aluminum material as the surface layer.

Also, shielding of alternating field is enabled, magnetic field leakage is reduced, and motor efficiency can be enhanced when used as a rotor shaft 4 of a motor generator M/G by forming an aluminum layer of an aluminum material on the product surface.

Effects of the Laminate Spinning Processing Method and the Rotor Shaft in the First Embodiment The following effects can be obtained from the laminate spinning processing method and the rotor shaft in the first embodiment.

(1) A spinning processing method for processing cylindrical parts (rotor shaft 4) is provided with a material joining step of aligning the sheet surfaces and joining at least two sheets of metal plates 40*a*, 40*b*, 40*c* (FIG. 3), a material separation and deformation step of rotating the metal plates 40*a*, 40*b*, 40*c* by a rotating shaft CL that is perpendicular to the surface of the sheet material and carrying out separation and deformation by applying force at the coupling position on the periphery of at least two sheets of metal plates 40*a*, 40*b*, 40*c* that have been joined (FIG. 4), and a cylinder forming step of applying force to at least one piece of metal plates 40*a*, 40*b* and forming a cylinder along the rotating shaft CL (FIG. 5). Consequently, the process is made easy even for cylindrical parts (rotor shaft 4) that have an unbalanced sheet thickness and volume. In addition, the metal material of the cylindrical parts (rotor shaft 4) is not restricted to one kind of metal material and various kinds of metal materials are usable.

(2) The material joining step is a step of aligning and joining one piece of the second metal plate 40*c* wherein the material is different from the first metal plates 40*a*, 40*b* between the two sheets of the first metal plates 40*a*, 40*b*, the material separation and deformation step is a step of separating and deforming the two sheets of the first metal plates 40*a*, 40*b* arranged on both sides of the one piece of the second metal plate 40*c* arranged at the center by applying force at the coupling position on the periphery of the two sheets of the first metal plates 40*a*, 40*b* arranged on both sides and joined to the second metal plate 40*c*, and the cylinder forming step is a step of applying force to two sheets of the first metal plates 40*a*, 40*b* arranged on both sides and forming a cylinder along the rotating shaft CL, and furthermore, after the cylinder forming step, there are a splitting apart step (FIG. 6) of splitting apart one piece of the second metal plate 40*c* arranged at the center according to the splitting apart method, and a second metal sheet layer-forming step (aluminum layer-forming step: FIG. 7) of forming a second metal layer on the surface of the first metal cylinder along the rotating shaft CL by applying force to the second metal plate 40*c* that has been split apart. Consequently, in addition to the effects in (1), it is possible to manufacture cylindrical parts (rotor shaft 4) that used a triple structure of first metal plate 40*a*-second metal plate 40*c*-first metal plate 40*b* as the material, and laminated a second metal layer on the first metal plate, which is the primary structure.

(3) The cylindrical parts is a motor rotor (rotor shaft 4) for supporting the rotor 21 of a motor (motor/generator M/G), the two sheets of the first metal plates 40*a*, 40*b* is a steel sheet material, the one piece of the second metal plate 40*c* is an aluminum sheet material, and the second metal layer forming step is an aluminum layer forming step (FIG. 7) for forming an aluminum layer on the cylindrical surface of the steel cylinder that was formed according to the cylinder forming step. Consequently, in addition to the effects in (2), shielding of the alternating field is enabled, magnetic field leakage is reduced, and the motor efficiency can be enhanced when the manufactured cylindrical parts is used as the rotor shaft 4 of a motor (motor/generator M/G).

(4) The material joining step is a step of aligning and joining the surfaces of the two sheets of the metal plates (first metal plates 40*a*, 40*b*) wherein the sheet thicknesses d1, d2 vary. Consequently, in addition to the effects in (1)-(3), cylindrical parts (rotor shaft 4) that have an unbalanced sheet thickness and volume can be manufactured easily just by carrying out separation and deformation by applying force at the coupling position on the periphery of the two sheets of the metal plates (first metal plates 40*a*, 40*b*).

(5) The material joining step is a step of aligning the surfaces of multiple metal plates (first metal plates 40*a*, 40*b*, second metal plate 40*c*) and joining them by welding the part that is the center of rotation. Consequently, in addition to the effects in (1)-(4), a plurality of materials that form the manufactured cylindrical parts (rotor shaft 4) can be joined firmly while making the separation and deformation of multiple metal plates (first metal plates 40*a*, 40*b*, second metal plate 40*c*) easy during the process.

(6) It is a rotor shaft 4, which has a cylindrical part (cylindrical drum 41) and a partition wall 42 that extends inward in the radial direction from the interior of the cylindrical part and supports the rotor 21 of a motor (motor/generator M/G), and it further has: an aluminum layer that forms the peripheral surface of the cylindrical part (cylindrical drum 41) where the rotor 21 of the motor (motor/generator M/G) is supported and the inside layer of the partition wall 42, and a steel sheet layer that forms the inner circumferential surface of the cylindrical part (cylindrical drum 41) and the outside layer of the partition wall 42. Consequently, shielding of the alternating field is enabled, magnetic field leakage is reduced, and the motor efficiency can be enhanced when used as a rotor shaft 4 due to having an aluminum layer formed on the rotor support surface of the motor (motor/generator M/G).

A spinning processing method and a rotor shaft in the present invention were explained above based on the first embodiment. However, the specific configuration is not restricted to this first embodiment; modifications, additions, or the like in the design are allowed as long as it does not deviate from the essence of the invention in the claims.

In the first embodiment, an example of aligning and joining the sheet surfaces of the three sheets of metal plates 40a, 40b, and 40c was shown as the material joining step. However, it is possible to align and join the sheet surfaces of the two sheets of metal plates, or to align and join the sheet surfaces of the four sheets of metal plates in the material joining step. In short, all that is necessary is for the material joining step to be a step that aligns and joins the sheet surfaces of at least two sheets of metal plates.

Shown in the first embodiment was an example of the material separation and deformation step of separating and deforming the two sheets of the first metal plates 40a, 40b arranged on both sides of one sheet of the second metal plate 40c arranged at the center by applying force at the coupling position on the periphery of the two sheets of the first metal plates 40a, 40b that have been joined and arranged on both sides of the second metal plate 40c. However, all that is necessary is for the material separation and deformation step to be a step that rotates the metal plate by a rotating shaft that is perpendicular to the surface of the sheet material and carries out separation and deformation by applying force at the coupling position on the periphery of at least two sheets of the metal plates that have been joined.

In the first embodiment, an example of forming a cylinder along the rotating shaft CL by applying force to the two pieces of the first metal plates 40a, 40b that are arranged on both sides was shown as the cylinder forming step. However, all that is necessary is for the cylinder forming step to be a step that forms a cylinder along the rotating shaft by applying force to at least one sheet of metal plate.

Shown in the first embodiment was an example of a laminate spinning processing method for manufacturing a rotor shaft 4 that used a triple layer structure of steel sheet material-aluminum sheet material-steel sheet material as the material and laminated an aluminum layer on the steel sheet material, which is the primary structure. However, the example can be a spinning processing method that uses a double layer structure as the material. In this case, the splitting apart step and the second metal layer forming step that were added in the laminate spinning processing method are not necessary.

Shown in the first embodiment was an example of manufacturing a rotor shaft 4 that functions as both a support for the rotor 21 of a motor/generator M/G and as a clutch drum. However, as long as it is cylindrical parts, the spinning processing method in the present invention can be applied to various cylindrical parts wherein the shape of the product is cylindrical such as a motor rotor dedicated to supporting the rotor of a motor, a clutch drum of an automatic transmission, or the like.

The invention claimed is:

1. A spinning processing method of processing cylindrical parts, the spinning processing method comprising:
    joining at least two sheets of metal plates by bring together sheet surfaces of the metal plates;
    rotating the metal plates using a rotating shaft that is arranged perpendicular to the sheet surfaces of the metal plates;
    applying a separating and deforming force at a coupling position on a periphery of the at least two sheets of the metal plates to separate and deform the metal plates while the at least two sheets of the metal plates rotate; and
    applying a cylinder forming force to at least one of the metal plates to form a cylinder along the rotating shaft.

2. The spinning processing method according to claim 1, wherein
    the joining of the at least two sheets of the metal plates includes joining two first metal plates and a second metal plate with the second metal plate being made of a material that is different from that of the first metal plates and the second metal plate being disposed between the first metal plates,
    the applying of the separating and deforming force is further accomplished by applying the separating and deforming force at the coupling position on the periphery of the first metal plates arranged on both sides and joined to the second metal plate,
    the applying cylinder forming force is further accomplished by applying the cylinder forming force to the first metal plates arranged on both sides and forming the cylinder along the rotating shaft, and
    further comprising splitting apart a portion of the second metal plate into two parts, and
    forming a metal layer on a surface of the first metal plates forming the cylinder by applying a force to the two parts of the second metal plate that has been split apart.

3. The spinning processing method according to claim 2, wherein
    the cylinder is a motor rotor shaft for supporting a rotor of a motor,
    the first metal plates are each a steel sheet material,
    the second metal plate is an aluminum sheet material, and
    the forming of the metal layer is an aluminum layer-forming step for forming an aluminum layer on the surface of the first metal plates forming the cylinder that was formed.

4. The spinning processing method according to claim 1, wherein
    the joining of the at least two sheets of the metal plates includes using sheet thicknesses that varies between the at least two sheets of the metal plates.

5. The spinning processing method according to claim 1, wherein
    the joining of the at least two plates is further accomplished by welding a part that is adjacent a center of rotation.

6. The spinning processing method according to claim 2, wherein
    the joining of the first metal plates includes using sheet thicknesses that varies between the first metal plates.

7. The spinning processing method according to claim 2, wherein
    the joining of the at least two plates is further accomplished-by welding a part that is adjacent a center of rotation.

8. The spinning processing method according to claim 3, wherein
    the joining of the first metal plates includes using sheet thicknesses that varies between the first metal plates.

9. The spinning processing method according to claim 3, wherein
    the joining of the at least two plates is further accomplished-by welding a part that is adjacent a center of rotation.

* * * * *